United States Patent [19]

Kahn

[11] 4,217,661
[45] Aug. 12, 1980

[54] AUDIO SIGNAL TRANSMISSION SYSTEM AND METHOD INCORPORATING AUTOMATIC FREQUENCY CORRECTION

[76] Inventor: Leonard R. Kahn, 137 E. 36th St., New York, N.Y. 10016

[21] Appl. No.: 621,669

[22] Filed: Oct. 14, 1975

[51] Int. Cl.² .............................................. H04B 1/68
[52] U.S. Cl. ...................................... 455/59; 455/46; 455/47; 455/71
[58] Field of Search ......... 179/15 BP, 15 FS, 15 FD; 325/49, 50, 63, 59

[56] References Cited

U.S. PATENT DOCUMENTS

| | | | |
|---|---|---|---|
| 2,576,115 | 11/1951 | Hill | 325/59 |
| 3,384,824 | 5/1968 | Grenier | 325/60 X |

FOREIGN PATENT DOCUMENTS 480847  3/1938  United Kingdom ...................... 325/63

*Primary Examiner*—Benedict V. Safourek

[57] ABSTRACT

An improved system and method for processing relatively high fidelity audio signals having a frequency range, for example, of between about 50 Hz and 5,000 Hz for transmission over two or more relatively low fidelity transmission channels, such as voice grade telephone or radio channels having a limited frequency response of 300 to 3,000 Hz, for example.

Typical practice of the invention involves separation of the signal into two halves; one covering the lower segment between about 50 to 2,600 Hz, for example, which is transmitted over one voice grade channel, and the upper segment between about 2,500 Hz to 5,000 Hz, for example, which is transmitted over the second voice grade channel.

Two sinusoidal tones are transmitted for frequency and phase correction purposes. The frequencies of these tones are preferably outside the translation frequency range of the signal components and are related in frequency by a simple ratio, typically an integer. The tones are used to control frequency correction circuitry in the receiver or demodulator.

Phase comparison of the overlapping frequency components, in typical practice 2,500 Hz to 2,600 Hz, is used to place overlap components in the desired phase relationship.

10 Claims, 3 Drawing Figures

AUDIO SIGNAL TRANSMISSION SYSTEM AND METHOD INCORPORATING AUTOMATIC FREQUENCY CORRECTION

BACKGROUND OF THE INVENTION

1. Field of the Invention

While the invention is subject to a number of different applications, it is especially suited for use in the transmission of wideband information over a multiplicity of narrowband channels and will be particularly described in that connection.

It is desirable when combining narrowband channels that the individual channels are free of frequency translation errors. This invention uses the transmission of two tones having a known frequency ratio as a basis for frequency and phase correction. The two tones are combined with at least a portion of the signal prior to transmission over one of the narrowband channels and means are provided at the receive end of the circuit for sensing any error in the ratio of the tone frequencies and additional means are provided for correcting any error in the ratio. At least one of the tones is also combined with signal components for transmission over the other narrowband channels so that all channels can be frequency corrected.

Overlap components are transmitted over two of the narrowband transmission circuits and one set of overlap components are automatically phase controlled so that the frequency components from one narrowband circuit matches corresponding components from a second narrowband component. In order to avoid holes in the spectrum response, overlap components should be provided for those points of the spectrum where the holes may be created. For example, where wideband intelligence is split into two segments the highest frequency edge of the lower frequency segment and the lowest frequency edge of the highest frequency segment require overlap components. Memory circuitry is also provided for maintaining the relative phase of the overlap components to a desired value during periods when the overlap components are weak or missing. The automatic frequency correction and phase correction method disclosed herein, utilizing two tones having a known frequency ratio, may also be used for SSB transmission and other systems where only one transmission channel is used.

2. Description of the Prior Art

There are a large number of narrowband voice grade circuits available at relatively low cost. However, in many situations such as the transmission of music, the intelligence transmitted requires wider bandwidth circuits. While wideband bandwidth circuits can be made available they are relatively expensive.

In U.S. Pat. No. 3,696,298 issued to Kahn and Gordon on Oct. 3, 1972, and U.S. Pat. No. 3,684,838 issued to Kahn on Aug. 15, 1972, systems were disclosed for improving the overall response of narrowband transmission links. U.S. Pat. No. 3,696,298 describes a method whereby two or more narrowband channels are combined so that relatively wideband signals may be transmitted. Use is made of frequency translation of various components so as to make those signal components suitable for transmission over a narrowband channel. Equipment utilizing this invention has been used in a number of circuits. In that equipment, however, while the resulting sound is superior to that of a narrowband circuit, there are frequency cuts or holes in the frequency response which may degrade certain types of transmission and which are apparent when one measures the overall frequency response of the circuit. For example, data signals may have large amplitude components at the cut frequency, and thus serious degradation of transmission may result.

U.S. Pat. No. 3,684,838 only requires a single narrowband channel. A small segment of that circuit is used for transmission of frequency components that will normally fall outside of the response of the narrowband circuit. For the natural sounding transmission of voice, it is desirable that sound components between 100 Hz and 250 Hz be transmitted. These components; however, do not normally pass through a narrowband telephone circuit. U.S. Pat. No. 3,684,838 discloses a system for transmitting such components along with the bulk of the high energy components of the voice. While this system greatly improves voice transmission it does not improve higher frequency response.

Other inventions that are related to segmented signal waves or to phasing of signal components are my U.S. Pat. No. 3,528,012 issued Sept. 8, 1970 and U.S. Pat. No. 3,364,428 issued Jan. 16, 1968.

SUMMARY OF THE INVENTION

The present invention substantially obviates one or more of the limitations and disadvantages of the described prior art arrangements.

This invention discloses means and methods for utilizing a multiplicity of relatively narrowband circuits to provide a wideband channel without frequency cuts in the overall frequency response. Another basic object, feature, and advantage to the invention, is that it provides circuitry for the removal of frequency errors caused by imperfections in the frequency accuracy of oscillators used in the subject invention and in circuitry incorporated in the narrowband channels. Besides removing frequency errors, this invention provides means for insuring the proper relative phase relationships between overlap frequency components.

Another embodiment of this system would improve the transmission of data over single-sideband systems or other communication systems whose performance can be improved by automatic frequency correction or automatic phase correction. In one embodiment of the invention a communications system, subject to frequency translation error, is improved by using two tones having a known frequency ratio, which are combined with at least a portion of the signal components prior to transmission. At the receive end of the circuit means are provided for sensing any error in the ratio of the frequency of the tones transmitted along with the signal components and the errors sensed are corrected so as to provide the desired frequency correction.

BRIEF DESCRIPTION OF THE DRAWINGS

These, and other objects, features, characteristics and advantages of the systems and signal development techniques of the invention will be apparent from the following description of certain typical forms thereof, taken together with the accompanying drawings.

DESCRIPTION OF THE PREFERRED EMBODIMENT

Figure 1:
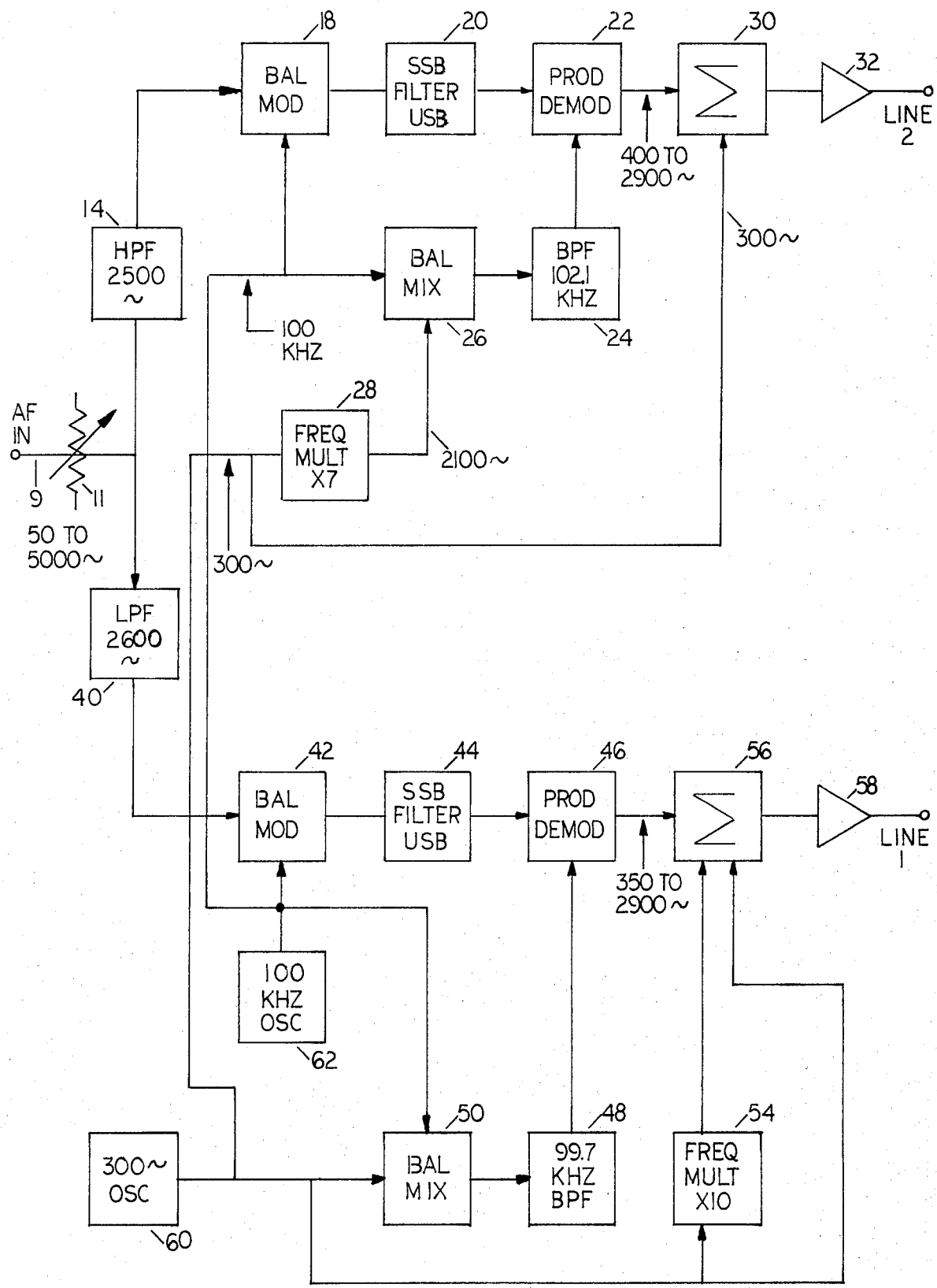
FIG. 1 is a block diagram showing a form of the invention for processing a relatively wideband signal into a wave suitable for transmission over two relatively narrowband channels.

FIG. 1 shows the transmitter portion of the system wherein a wideband signal is processed so as to split the wave into two segments suitable for transmission over two relatively narrowband channels, one covering the components of the wideband wave ranging in frequency from 50 Hz to 2,600 Hz and the other segment covering a range of 2,500 Hz to 5,000 Hz. There is an overlap of frequency components in this embodiment in the range of 2,500 Hz to 2,600 Hz. The overlap components from the two narrowband lines are combined in the receiver to provide a relatively flat overall frequency response.

The 50 Hz to 2,600 Hz signal components from the wideband signal are converted in frequency to cover a range of 350 Hz to 2,900 Hz and this segment is fed to line 1. The 2,500 Hz to 5,000 Hz signal components of the wideband wave are converted to 400 Hz to 2,900 Hz and the frequency translated wave is fed to line 2. This procedure insures that normal voice grade circuits will pass all of the desired signal components. In addition to the lower frequency signal components, line 1 is fed 300 Hz and 3,000 Hz tones. (The transmitted frequency ratio of the two tones in this embodiment is the integer 10; i.e. 3,000 Hz divided by 300 Hz.) The lower frequency tone, 300 Hz, is also transmitted over line 2 along with the higher frequency signal components. The 300 Hz and 3,000 Hz tones are used at the receive end of the system to remove frequency translation errors.

The audio wave input is fed through level adjust attenuator 11 to highpass filter 14 and lowpass filter 40. Highpass filter 14 passes frequency components greater than 2,500 Hz. These components are then fed to balanced modulator 18 which is also fed a 100 kHz wave produced in oscillator 62 which preferably uses a crystal to control its frequency. Thus, a 100 kHz double-sideband suppressed carrier wave is produced at the output of balanced modulator 18.

The upper sideband component is selected by SSB filter 20 which in turn feeds product demodulator 22. Product demodulator 22 is also fed a mixing frequency of 102.1 kHz. Since the product demodulator is fed a wave 2.1 kHz above the carrier frequency fed to balanced modulator 18 the various frequency components are reduced by 2,100 Hz. Accordingly, a 2,500 Hz signal component would be reduced to 400 Hz and a 5,000 Hz signal component to 2,900 Hz.

In order to avoid spurious mixing products, balanced modulator 18 should be well balanced and it is desirable that sideband filter 20 attenuate the carrier component at 100 kHz. The high frequency components which have been displaced to a range of 400 Hz to 2,900 Hz are fed to summation circuit 30 where they are combined with a 300 Hz tone which is used for frequency correction purposes in the receiver. The output of summation circuit 30 then feeds line amplifier 32. The 300 Hz wave is generated in oscillator 60.

Part of the output of attenuator 11 passes through lowpass filter 40 which greatly attenuates components of the signal above 2,600 Hz allowing low frequency components to feed balanced modulator 42 which in turn feeds upper single-sideband filter 44.

In the same fashion as above described, an SSB wave is produced at the output of sideband filter 44 which in turn feeds product demodulator 46. In this case, product demodulator 46 is fed a 99.7 kHz wave. Since this wave is 300 Hz lower than the 100 kHz carrier fed to balanced modulator 42 all of the components are increased by 300 Hz. Thus, a 50 Hz signal component is converted to 350 Hz and a 2,600 Hz signal component is converted to 2,900 Hz. These frequencies are suitable for transmission over a voice quality line.

One method for producing the 99.7 kHz wave, which is fed to product demodulator 46, is to mix the 300 Hz wave from oscillator 60 in balanced mixer 50 with the 100 kHz wave from oscillator 62 and select the difference component in bandpass filter 48. The 102.1 kHz wave, which is fed to product demodulator 22, is generated in a similar fashion. In this case, the 2,100 Hz wave used to feed balanced mixer 26 and selected by filter 24 is derived by multiplying the 300 Hz output of oscillator 60 by a factor of 7 in frequency multiplier 28.

The output of product demodulator 46, covering the range of 350 Hz to 2,900 Hz, feeds summation circuit 56. The 300 Hz and 3,000 Hz tones are also fed to summation circuit 56. The 3,000 Hz sine wave is produced by multiplying the 300 Hz output of oscillator 60 by a factor of 10 in frequency multiplier 54. The combined wave is fed to line amplifier 58 which in turn feeds line 1.

Figure 2:
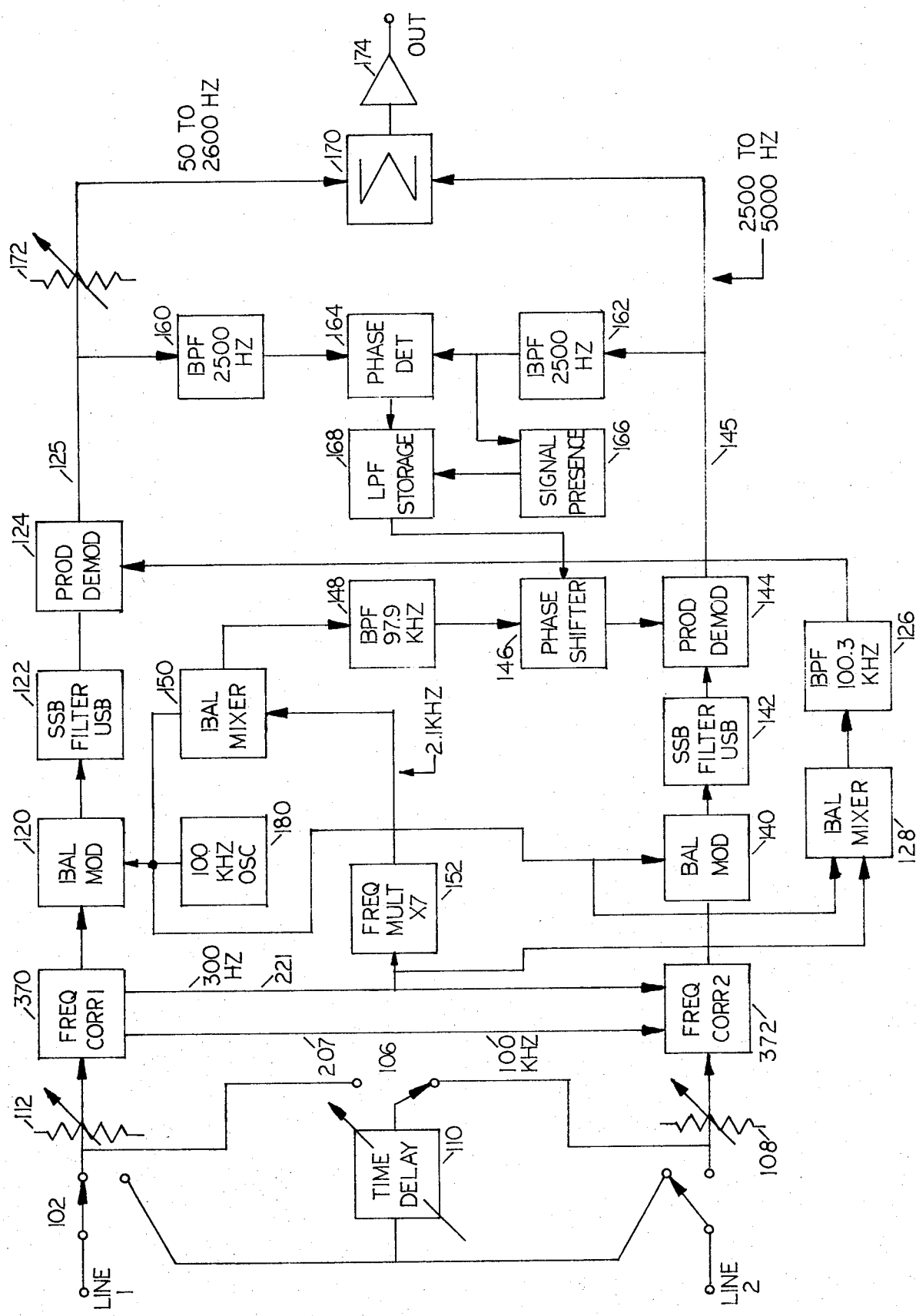
FIG. 2 is a block diagram showing a form of the invention for processing the received wave from the two relatively narrowband channels to reconstruct the original wideband signal.

FIG. 2 is a block diagram of the receiver portion of the system. Line 1 feeds switch 102 which allows a variable time delay network 110 to be inserted in its path. Switches 104 and 106 are used in conjunction with 102 to allow the time delay network 110 to be placed in whichever line path has the smaller time delay. In this fashion, it is possible to minimize time delay differences between line 1 and line 2. The block shows the variable time delay unit 110 connected in the path of line 2 which would be proper arrangement if line 2 had less time delay than line 1. Time delay unit 110 can then be varied so that the total time delay in line 2 equals the time delay in line 1. Similar procedures for reducing the time delay differential and for translating frequency segments are described in U.S. Pat. No. 3,696,298.

Line 1 is connected to attenuator 112 which allows the amplitude to be set to a desired level. Frequency corrector 1, block 370, corrects the frequency of the signal components transmitted over line 1. This circuit is shown in detail in FIG. 3 and its operation will be described below. The output of the frequency corrector is fed to balanced modulator 120 which is also fed a 100 kHz wave from a 100 kHz oscillator 180. Oscillator circuit 180 is preferably a crystal oscillator.

Balanced modulator 120 feeds upper sideband filter 122 which selects the summation frequency components from balanced modulator 120. The output of SSB filter 122 feeds product demodulator 124. A 100.3 kHz wave from bandpass filter 126 also feeds product demodulator 124. By this procedure, all audio signal components from line 1 are reduced in frequencies by 300 Hz compensating for the upward frequency translation in the transmitter and restoring them to their original 50 Hz to 2,600 Hz frequency range. The 100.3 kHz wave is produced by mixing the frequency corrected 300 Hz tone from frequency corrector 1, block 370, with the 100 kHz wave produced by oscillator 180 in balanced mixer 128. The desired summation component at 100.3 kHz is selected by bandpass filter 126.

These lower frequency signal components are then passed through attenuator 172 which sets the levels so that they bear the proper relationship to the higher frequency components added in summation circuit 170.

The output from line 2, appearing at the output of attenuator 108 is fed to frequency corrector 2, block 372, which is shown in detail in FIG. 3 and described below. The corrected frequencies at the output of block 372 feed balanced modulator 140 which produces a double-sideband suppressed carrier wave. This wave is fed to upper sideband filter 142 which selects the upper sideband wave of the double-sideband wave. The sideband wave is then fed to product demodulator 144. Also fed to product demodulator 144 is a 97.9 kHz wave. By this procedure, the audio signal components from line 2 are increased in frequency by 2,100 Hz restoring them to their original 2,500 Hz to 5,000 Hz frequency range. The 97.9 kHz wave is produced by balance mixing the 100 kHz wave from oscillator 180 with the 2.1 kHz produced by frequency multiplying the 300 Hz wave from frequency corrector 1 by a factor of 7 in frequency multiplier 152 and selecting the difference component from balanced mixer 150 in bandpass filter 148. The output of product demodulator 144 feeds summation circuit 170 where the low and high frequency components are combined. The output of the summation circuit then feeds amplifier 174. The equipment required for translating the frequency components of the original wideband wave and restoring the components to their original values is similar to that described in U.S. Pat. No. 3,696,298.

In order to produce a flat frequency response, common frequency (overlap) components from the two lines should be in phase at the 6 db crossover frequency points at approximately 2,550 Hz for example. In order to ensure this, a sample of these components from the output of product demodulator 124 on line 125 is compared with a sample at the same frequency produced at the output of product demodulator 144 on line 145. The phase of the samples at the output of bandpass filters 160 and 162 are compared in phase detector 164. The output of phase detector 164 feeds a lowpass filter and storage circuit 168. When signal components are present the lowpass filter feeds the output of phase detector 164 to phase shifter 146. By this procedure, the signal components at the output of product demodulator 144 are shifted into phase coherence with the same frequency components appearing on line 125.

During periods when the 2,500 Hz components are absent, the circuit is held at its last phase correction condition by action of the lowpass filter/storage circuit 168 and signal presence detector 166. Storage means, incorporating capacitors, resistors and switching devices are well known in the field and one such circuit was described in some detail in my U.S. Pat. No. 3,275,940 issued Sept. 27, 1966. The signal presence circuit 166 may be a simple diode detector circuit followed by a threshold device that provides output of one polarity when the signal exceeds a certain level and the other polarity (the polarity which causes storage circuit 168 to switch to the storage condition) when the signal is absent or below the threshold point. If signal components in the 2,500 Hz to 2,600 Hz range are weak or absent, block 168 is switched to the storage condition maintaining the last level of voltage fed to phase shifter 146. The proper phase characteristic is thus maintained so that the signals add in phase even after pauses in signal flow. Generally, the optimum fixed phase relationship of the overlap components at the center of the overlap region (cross-over point) should be zero degrees so that the two overlap components add in phase. However, in some situations a different fixed phase may be selected in order to improve time delay characteristics. A related problem of combining segmented frequencies in proper phase and amplitude is discussed in U.S. Pat. No. 3,364,428 issued on Jan. 16, 1968.

One of the important characteristics of the system is that the frequency components from the two narrowband lines do not suffer frequency translation errors. Special circuitry is included in the receiver in order to remove translation errors introduced by the multiplexing equipment used in telephone carrier systems or by the subject invention equipment. These errors are generally small, in the order of 1 Hz or 2 Hz, and do not disturb normal telephone performance. However, such errors would introduce, in this system, "beating effects" at the overlap frequencies and would make it impossible to insure proper inphase addition at the crossover frequency points. Thus, it is essential that even small frequency translation errors be removed by the receiving equipment.

As described above, line 1, in addition to carrying the low frequency portion of the wideband signal, also carries tones at 300 Hz and at 3,000 Hz. These tones are generated in the transmitter by stable 300 Hz oscillator 60 and ten times frequency multiplier 54.

The overall frequency control system operates so as to insure that the 3,000 Hz tone at the output of the correction system (frequency corrector 1 block 370) is precisely ten times the 300 Hz component which is also corrected in frequency corrector 1 and that the 300 Hz tone transmitted over line 2 is corrected by frequency corrector 2 block 372 to equal the 300 Hz tone corrected by frequency corrector 1 block 370 in line 1. By this procedure, one can be certain that the absolute frequencies are equal to those transmitted by the transmitting circuitry.

Figure 3:
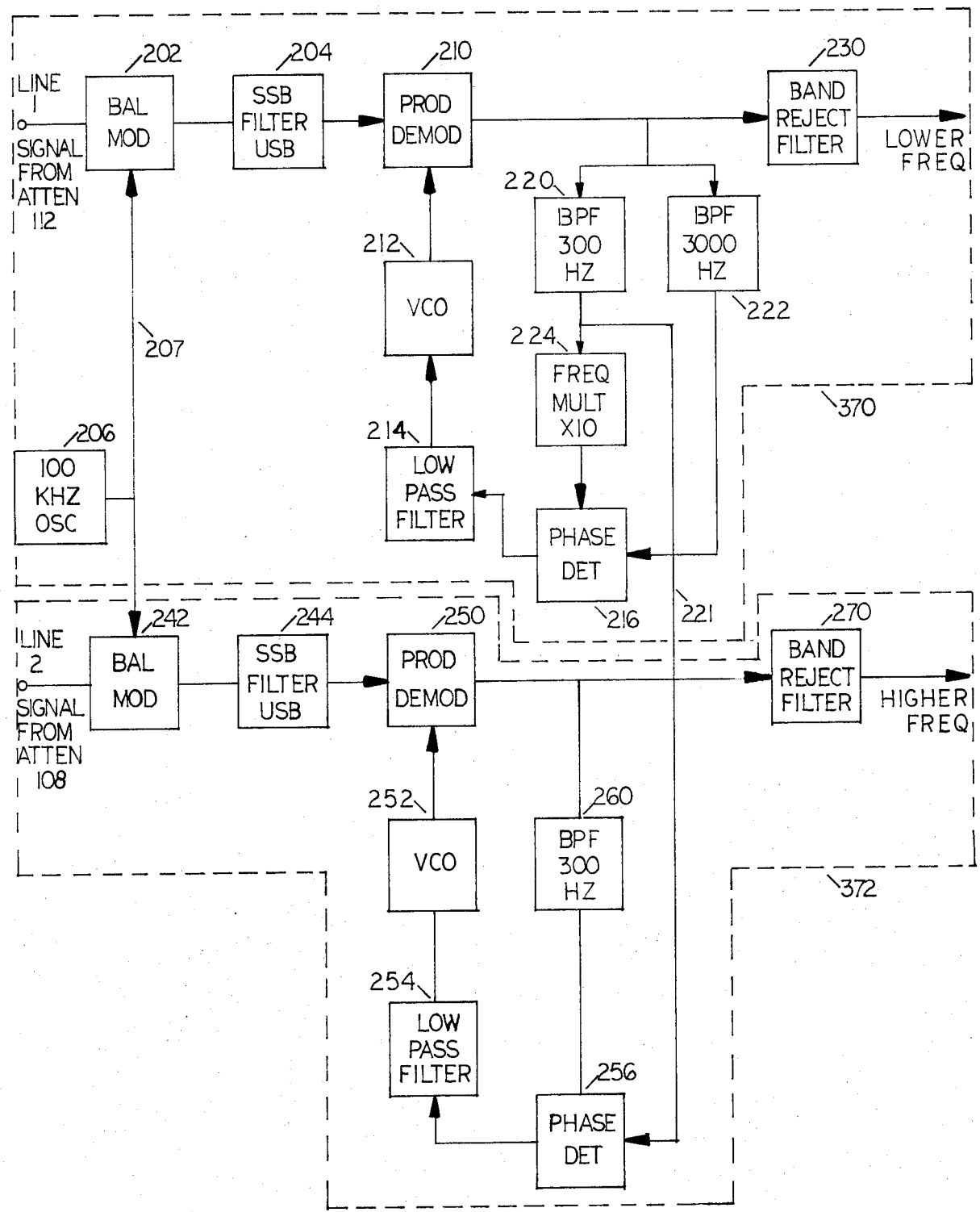
FIG. 3 is a block diagram showing additional details of a form of the frequency and phase correction invention to be used in the apparatus shown in FIG. 2.

Referring to FIG. 3, wherein details of blocks 370 and 372 are shown, the output of line 1, after passing through the time delay switching network and the attenuator, feeds balanced modulator 202. Also feeding the balanced modulator is 100 kHz oscillator 206. Thus, the output of balanced modulator 202 is a double-sided suppressed carrier signal. The output of the balanced modulator is passed through an upper single-sideband filter 204 which selects the summation components; i.e., the upper sideband of the double-sideband wave. This wave then feeds product demodulator 210.

If there is no frequency error present, voltage control oscillator (VCO) 212 will operate at exactly the same frequency as oscillator 206. If there is an error, the VCO is shifted in frequency so as to restore the frequency of each signal component to the correct frequency. The system shown, operates as a phase locked loop (PLL) and its basic design is well known. For example, see "Phaselock Techniques" by Flyod M. Gardner, 1966, published by John Wiley & Sons, Inc. for design details.

The output of product demodulator 210 feeds bandpass filters 220 and 222. Bandpass filter 220 has a bandwidth of 25 Hz, for example, at a center frequency of 300 Hz. It therefore passes the lower frequency tone transmitted on line 1. The output of the filter feeds frequency multiplier 224. This multiplier multiplies the 300 Hz tone by a factor of 10. This multiplication factor is equal to the known frequency ratio of the original two tones. The output of frequency multiplier 224 feeds phase detector 216. Also fed to phase detector 216 is the output of the 300 Hz bandpass filter 222. The bandwidth of bandpass filter 222 should be as narrow as possible consistent with reasonable cost but should not be less than approximately 25 Hz. If the two inputs to phase detector 216 are not exactly equal in frequency there is an error in the ratio of the frequency of the tones. This error is then sensed by phase detector 216 and an error voltage is fed through lowpass filter 214 to VCO 212. The error voltage then causes VCO 212 to shift its frequency of operation until the error is removed and the two tones at 300 Hz and 3,000 Hz are in the exact ratio as transmitted. The overall system comprising product demodulator 210, bandpass filters 220 and 222, frequency multiplier 224, phase detector 216, lowpass filter 214, and VCO 212, operate as a phase locked loop. Since the system provides exact duplication of the known transmitted ratio of the frequency of the two tones, the system ensures that the frequency of the 300 Hz tone at the receive end of the circuit is exactly equal to that of the tone generated at the transmit end of the system. Band reject filter 230 is provided to remove the 300 Hz and 3,000 Hz tones from the output signal.

The frequency corrector for line 2 is a simpler circuit because line 1 incorporates means for obtaining the identical 300 Hz frequency as transmitted. Therefore, all that is necessary is to provide circuitry for translating the frequency of the 300 Hz tone transmitted over line 2 to the corrected frequency of 300 Hz appearing at the output of the bandpass filter 220. This is achieved as follows:

The output of line 2, after passing through its attenuator, feeds balanced modulator 242 which is also fed by 100 kHz oscillator 206. Upper sideband filter 244, selects the upper sideband generated in balanced modulator 242, and feeds the upper sideband to product demodulator 250. If line 2 is free of frequency translation error, VCO 252 will operate at the identical frequency as that of oscillator 206. However, if there is an error, its frequency will shift to correct for the error. The correction of frequency error is performed in the following manner.

The output of product demodulator 250 feeds a bandpass filter tuned to 300 Hz and having a bandwidth of approximately 25 Hz. This filter, 260, then passes the 300 Hz component to phase detector 256 where it is compared with the corrected 300 Hz component from line 1 appearing on line 221. The phase detector then produces an output of such magnitude and polarity as to cause VCO 252 to bring the 300 Hz output from bandpass filter 260 into lock with the corrected 300 Hz frequency from bandpass filter 220.

LPF 254 is used to provide the proper phase locked loop operation and is conventional in its design. (See "Phaselock Techniques" by Floyd M. Gardner, 1966, published by John Wiley & Sons, Inc.). The output of the product demodulator is fed to band reject filter 270 which removes the 300 Hz tone leaving the desired higher frequency components which are then processed in the other circuitry shown in FIG. 2 as described above.

The system can be used to provide a frequency response greater than 50 Hz to 5,000 Hz by adding additional narrowband paths and providing additional overlap frequency components and additional circuitry for phasing the overlap components. For example, if a third narrowband line was used, the frequency response could be extended to approximately 50 Hz to 7,500 Hz and a fourth line would extend the response to approximately 50 Hz to 10,000 Hz, etc. The present invention can also split the wideband signal into three parts like the invention described in U.S. Pat. No. 3,696,298. However, this requires two crossover points with attendant additional overlap phase control circuitry.

From the foregoing, further variations and applications of the invention will be apparent to those skilled in the art to which the invention is addressed, within the scope of the following claims.

What is claimed is:

1. A frequency correction system for use with communications systems utilizing a multiplicity of communications channels comprising;
    (a) means for generating two tones having a known frequency ratio,
    (b) means for combining the two tones with the signal components of one of the communications channels,
    (c) means at the receive end of the circuit for sensing any error in the ratio of the frequency of the tones,
    (d) means for correcting said ratio by use of the error sensing means (c),
    (e) means at the transmit end of the circuit for combining at least one of the two tones generated in means (a) with the signal components transmitted over the channels other than the channel mentioned in (b) means,
    (f) means for comparing at least one of the received tones of the channels mentioned in means (e) with the corresponding tone mentioned in means (b), and,
    (g) means for using the comparison (f) to correct the frequency of the communications channels of means (e).

2. In a communications system subject to phase and frequency errors and wherein two or more relatively narrowband transmission circuits are used for the transmission of a relatively wideband signal without introducing frequency holes, the improvement comprising:
    (a) means for transmitting overlap components from one narrowband circuit to match corresponding overlap components from a second narrowband circuit,
    (b) automatic frequency control means which insures that all of the narrowband circuits are free of absolute frequency error,
    (c) means for correcting phase errors between the overlap components carried by two different narrowband channels, and
    (d) means for combining the wideband signal components so that the overall frequency response of the system is essentially flat including the overlap frequency range.

3. A method for transmitting a relatively wideband signal without introducing frequency holes over two or more relatively narrowband channels comprising:
    (a) segmenting and processing the wideband signal into frequency segments which include overlap frequency components prior to transmission, said segments being suitable for transmission over the narrowband channels,
    (b) removing any absolute frequency error of the received narrowband channels,
    (c) controlling the received phase of at least some of the received segments so that at least a substantial portion of the overlap components are properly phased, and, (d) processing and combining the narrowband segments at the receive end of the system so that the overall frequency response including overlap frequencies is relatively constant over the passband of the system.

4. A communications system for transmitting and receiving wideband signals over two or more relatively narrowband communications circuits, the improvement comprising;
(a) means for segmenting and processing the wideband signal into frequency segments which include overlap frequency components prior to transmission, said frequency segments being suitable for transmission over the narrowband channels,
(b) means for coupling the frequency segment produced by (a) means to individual relatively narrowband communications circuits whose far ends are connected to individual processing circuits of the associated receiving means,
(c) means for controlling the relative phase of at least some of the received overlap components so that at least a substantial portion of the overlap components are substantially in phase when the overlap components are combined, and,
(d) means for combining the received narrowband segments including the phase controlled overlap components so as to produce a relatively wideband signal.

5. A communications system according to claim 4 wherein the (a) means causes the overlap frequency width to be approximately 5% of the average frequency of the overlap components.

6. A communications system according to claim 4 wherein the (a) means causes the overlap frequency components to cover a frequency range of approximately 2,500 Hz to 2,600 Hz.

7. A communications system, according to claim 4 wherein the (c) means comprises a phase locked loop.

8. A communications system, according to claim 4, wherein storage means are provided to maintain phase control of (c) means constant during periods when the overlap components are relatively small in amplitude said storage means connected between phase comparison circuitry and phase shifting circuitry controlled by said comparison circuitry in the phase locked loop.

9. A communications system for transmission of relatively wideband signals over two or more relatively narrowband transmission channels, the improvement comprising;
(a) means for generating a two tone signal,
(b) means for summating the two tone signal with a first portion of a wideband input signal and feeding the combined wave to a first relatively narrowband transmission channel,
(c) means for summating one of the tones of said two tone signal with a second portion of the input wideband signal to produce a second combined wave and feeding the second combined wave to a second narrowband transmission channel,
(d) means for receiving the two tone signal and its accompanying portion of the wideband signal at a receive end of the first narrowband channel,
(e) means for utilizing the received two tone signal to remove frequency translation errors in the received portion of the wideband signal from the first narrowband channel and at least the tone of the two tone signal which is also used in the second combined wave,
(f) means for receiving the single tone and its accompanying portion of the wideband signal at the receive end of the second narrowband channel, and,
(g) means for controlling the frequency of the received single tone wave and the portion of the wideband signal which is transmitted over the second narrowband channel so as to cause the frequency of the single tone to at least closely approximate the frequency of the corresponding tone of the two tone wave after said corresponding tone is frequency corrected by (e) means.

10. A method for transmitting and receiving a relatively wideband signal without introducing frequency holes over two or more relatively narrow band channels comprising:
(a) Segmenting and processing the wideband signal into frequency segments which include overlap frequency components,
(b) Transmitting said segments over narrow band channels,
(c) receiving and controlling the phase of at least some of the received segments so that at least a substantial portion of the overlap components are properly phased, and,
(d) processing and combining the narrow band segments at the receive end of the system so that the overall frequency response including overlap frequencies is relatively constant over the passband of the system.

* * * * *